United States Patent [19]
Sezaki et al.

[11] Patent Number: 5,272,762
[45] Date of Patent: Dec. 21, 1993

[54] METHOD OF AND APPARATUS FOR INSPECTING WIRING PATTERN ON PRINTED BOARD

[75] Inventors: Yoshinori Sezaki; Tetsuo Hoki; Takao Kanai; Hitoshi Atsuta, all of Kyoto, Japan

[73] Assignee: Dainippon Screen MFG. Co., Ltd., Japan

[21] Appl. No.: 831,898

[22] Filed: Feb. 6, 1992

[30] Foreign Application Priority Data

Feb. 8, 1991 [JP] Japan .................................. 3-39181

[51] Int. Cl.⁵ .............................................. G06K 9/00
[52] U.S. Cl. ........................................ 382/8; 358/106
[58] Field of Search .................. 382/8, 106, 18, 22; 356/394, 398, 237

[56] References Cited

U.S. PATENT DOCUMENTS

| | | | |
|---|---|---|---|
| 4,500,202 | 2/1985 | Smyth | 382/8 |
| 4,794,647 | 12/1988 | Forgues et al. | 382/8 |
| 4,830,497 | 5/1989 | Iwata et al. | 382/8 |

Primary Examiner—David K. Moore
Assistant Examiner—D. R. Anderson
Attorney, Agent, or Firm—Ostrolenk, Faber, Gerb & Soffen

[57] ABSTRACT

The image of a wiring pattern provided on a printed board is obtained and binarized. A square pixel operator comprised of a matrix of pixels is applied to the pattern image. Pixel trains extending in different directions are extracted from the result of applying the square operator. The numbers of pixels having the binary value "1" on the pixel trains are counted to obtain the respective sizes of the pattern image on the pixel trains. Signals representing the respective sizes are subjected to timing adjustment operation and to obtain the width of the wiring pattern on an area larger than the square operator.

8 Claims, 16 Drawing Sheets

METHOD OF AND APPARATUS FOR INSPECTING WIRING PATTERN ON PRINTED BOARD

BACKGROUND OF THE INVENTION

1. Field of the Invention

The present invention relates to a method of and an apparatus for inspecting a wiring pattern formed on a printed circuit board.

2. Description of the Background Art

With reduction in size and weight as well as increase in performance of electronic parts, the wiring pattern on a printed board circuit is also refined and highly densified. Accordingly, refinement of lines, reduction of through hole diameters etc. are required.

As to such refined lines, it is further important to inspect and manage widths, disconnection, short-circuiting etc. thereof as compared with conventional patterns.

In order to inspect and manage such a wiring pattern, the printed board is photoelectrically scanned and a pattern image obtained by binarizing the wiring pattern is employed as data, which in turn are subjected to various processes for decision of defectiveness.

Such a binarized pattern image has generally been processed by a pixel operator.

FIG. 20 shows exemplary employment of a radial operator OP having eight arms. Pixels PIX which are two-dimensionally expanded in X and Y directions have respective data obtained by binarizing a wiring pattern. A logical level "1" is provided to pixels representing the wiring pattern, while another logical level "0" is provided to pixels representing areas of a base plate on which the wiring pattern is not located.

In order to cope with refinement of lines, it is necessary to reduce the pixels PIX, i.e., to improve resolution. On the other hand, the lines may include wide parts as well as narrow parts and the number of the pixels PIX should be large in order to detect various width of the wiring lines.

As a result, it is necessary to reduce the sizes and increase the number of the pixels forming the operator OP which is applied to the image of the wiring pattern.

However, such increase of the number of the pixels forming the operator OP requires increase of the number of the pixels PIX to be two-dimensionally expanded. This leads to disadvantageous increase of the amount of hardware such as shift registers for delaying image data associated with pixels serially obtained by the photoelectric scanning. It is difficult to use a large scale integrated circuit (LSI) for obtaining such a hardware, because the number of pins of the LSI is restricted to a relatively small number and the cost is considerably increased as compared with discrete elements.

SUMMARY OF THE INVENTION

The present invention is directed to a method of inspecting a wiring pattern provided on a printed board.

According to the present invention, the method comprises the steps of: reading an image of the wiring pattern to obtain a pattern image comprised of a pixel array; and applying a pixel operater to a first part of the pixel array to obtain first signals.

The pixel operator is comprised of a square matrix array of unit pixel operators.

The pixel operator is relatively shifted from the first part of the pixel array to a second part of the pixel array, and applied to the second part of the pixel array to obtain second signals.

The first signals are delayed to obtain delayed first signals.

The second signals are combined with the delayed first signals to obtain a set of signals. The set of signals have values representing the geometric shape of the pattern image on a radial array of pixels having a size larger than the pixel operator. The geometric shape of the pattern image may be the width of the pattern image, for example.

The wiring pattern is inspected on the basis of the set of pixel signals.

According to the present invention, the set of signals is equivalent to the result of applying a large scale radial operator to the pixel array. In other words, the method of the present invention substantially provides a large scale radial operator only with a pixel operator of a small size. It is to be noted that the large scale radial operator is not actually used, but the same function as the large scale radial operator is equivalently obtained through signal processing.

Thus, the wiring pattern can be inspected without increase in hardware corresponding to the radial operator.

The present invention also provides an apparatus adapted to conduct the present method.

Accordingly, an object of the present invention is to inspect a wiring pattern as without a large number of pixels while suppressing increase in the amount of hardware such as shift registers.

Another object is to extract a radial array of pixel trains from a matrix array of pixel data without a large number of pixels while suppressing increase in the amount of hardware.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

A. Overall Structure and Schematic Operation

Figure 14:
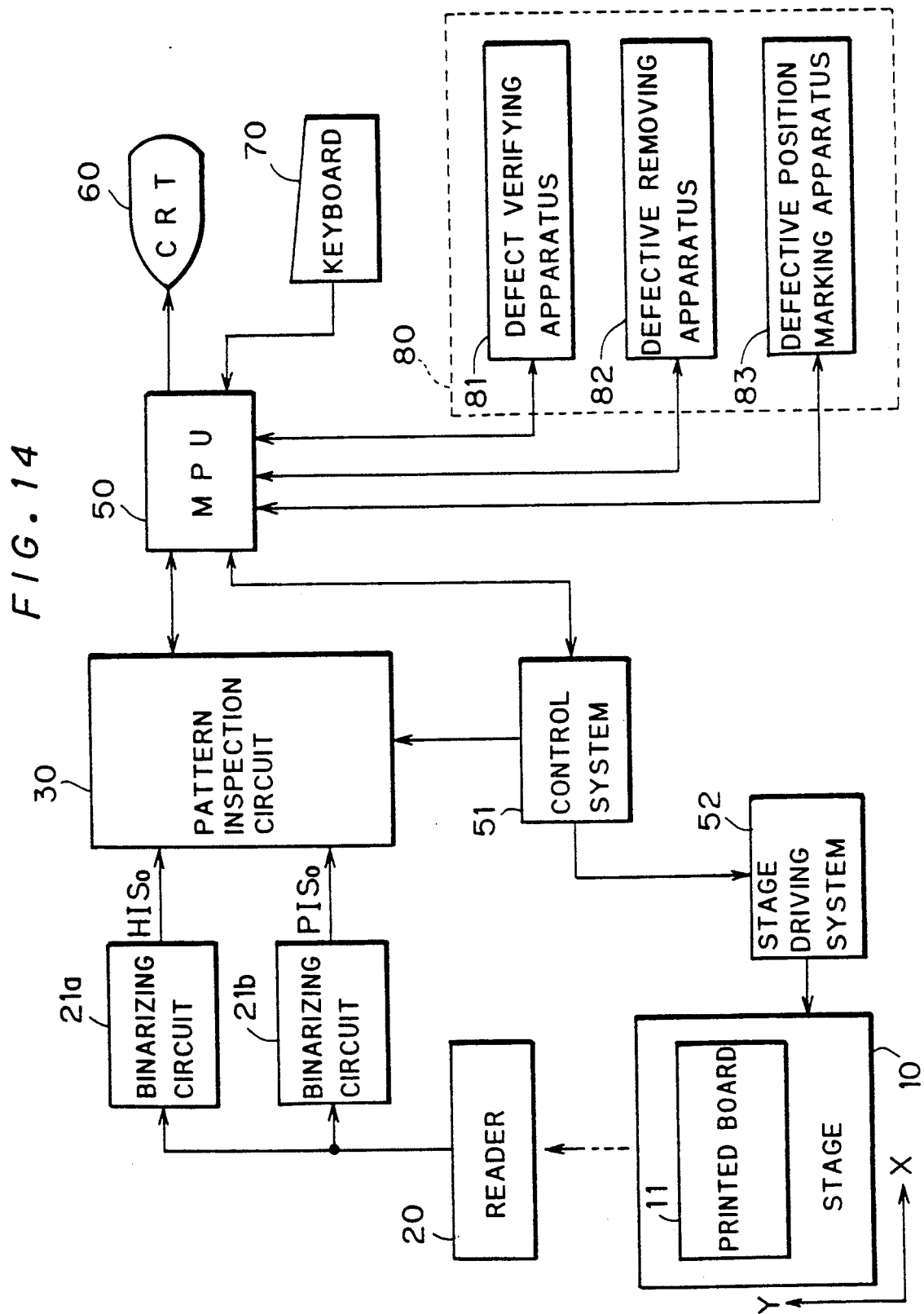
FIG. 14 is a block diagram showing the overall structure of a pattern inspection apparatus according to the preferred embodiment of the present invention.

FIG. 14 is a block diagram showing the overall structure of a pattern inspection apparatus according to a preferred embodiment of the present invention.

Figure 15:
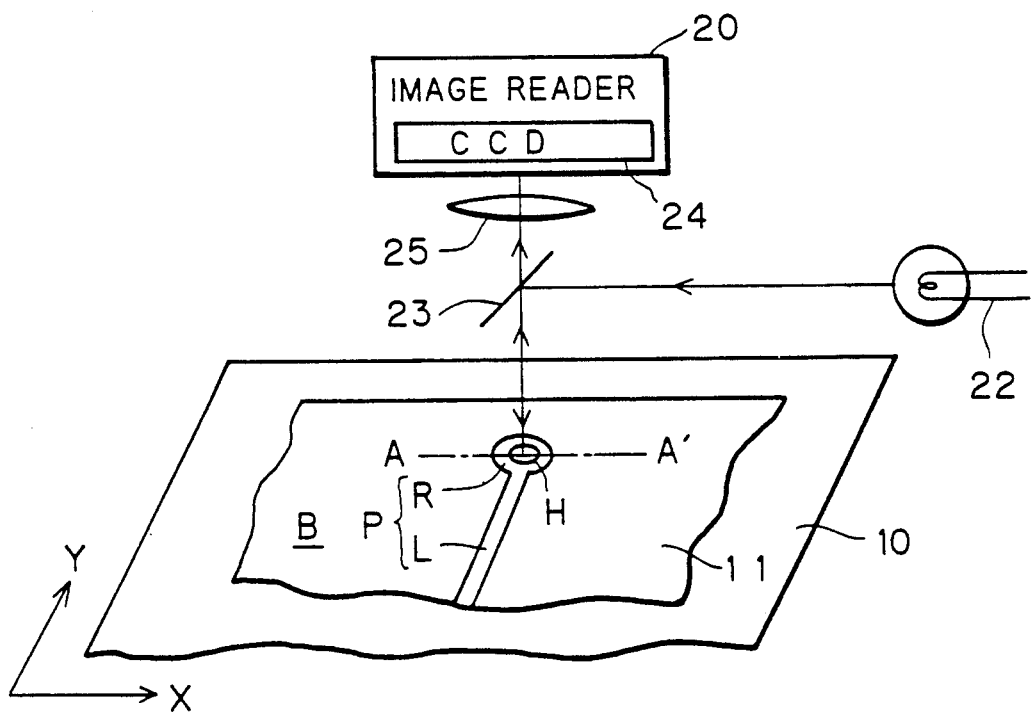
FIG. 15 is a conceptual diagram showing a system for image-reading through photoelectric scanning.

A printed circuit board 11 to be inspected is placed on a stage 10. As shown in FIG. 15, which will be described later in detail, the printed circuit board 11 comprises a base plate B on which a wiring pattern P including a wiring line L and a land R is formed. A through hole H is through the land R and the base plate B. In FIG. 14 the printed board 11 is fed in a carriage direction Y while the image of the printed board 11 is photoelectrically read by an image reader 20 sequentially along scanning lines. The scanning lines are in parallel to the direction X. The image reader 20 comprises a plurality of CCDs each having thousands of elements arrayed in the line direction X, and reads the images of the wiring pattern P and the through hole H of the printed board 11 for each pixel. The directions X and Y define a main scanning direction and a subscanning direction in the image-reading, respectively. Image data thus obtained are supplied to binarizing circuits 21a and 21b. The binarizing circuit 21a forms a hole image original signal $HIS_O$ representing the image of the through hole H, while the other binarizing circuit 21b forms a pattern image original signal $PIS_O$ representing the image of the wiring pattern P. Both of the signals $HIS_O$ and $PIS_O$ are inputted in a pattern inspection circuit 30.

The pattern inspection circuit 30 is operable to inspect the wiring pattern P and relative positional relation between the wiring pattern P and the through hole H. The results of the inspection are delivered to a central processing unit (MPU) 50.

The MPU 50 controls respective parts of the inspection apparatus through a control system 51. The control system 51 generates an X-Y address signal for specifying addresses of the data obtained in the pattern inspection circuit 30, for example. The X-Y address signal is also supplied to a stage driving system 52, to control a carriage mechanism of the stage 10.

A CRT 60 receives instructions from the MPU 50 and displays various operation results such as hole images. A keyboard 70 is employed for inputting various commands to the MPU 50.

An optional part 80 is provided with a defect verifying apparatus 81, a defective removing apparatus 82, a defective position marking apparatus 83 and the like. The defect verifying apparatus 81 is adapted to display a detected defect on the CRT 60, for example, in an enlarged manner. The defective removing apparatus 82 is adapted to carry a printed board 11 having a defect to a defective tray or the like. The defective position marking apparatus 83 is adapted to directly mark a defective portion of the printed board 11 or to mark a point on a separate sheet expressing the printed board 11. These apparatuses are optional.

B. Optical System For Image-Reading

FIG. 15 illustrates an optical system for obtaining the images of the wiring pattern and the through holes. The optical system comprises the stage 10, the image reader 20 shown in FIG. 14 and the like.

Referring to FIG. 15, light from a light source 22 is reflected by a half mirror 23 and applied onto the printed board 11 which is placed on the stage 10. The printed board is provided with the base plate B, the wiring pattern P and the through hole H, as already described. Although only one land R and one through hole H are illustrated in FIG. 15, large numbers of lands and through holes may be provided on the printed board 11.

The light reflected by the printed board 11 passes through the half mirror 23, to enter a CCD array 24 provided in the image reader 20 through a lens 25. The CCD array 24 receives the light reflected by the printed board 11 for each scanning line. The reflected light includes information as to the respective shapes and positions of he base B, the line L, the through hole H, the land R and the like provided on the printed board 11, which is fed in the carriage direction Y.

Figure 17:
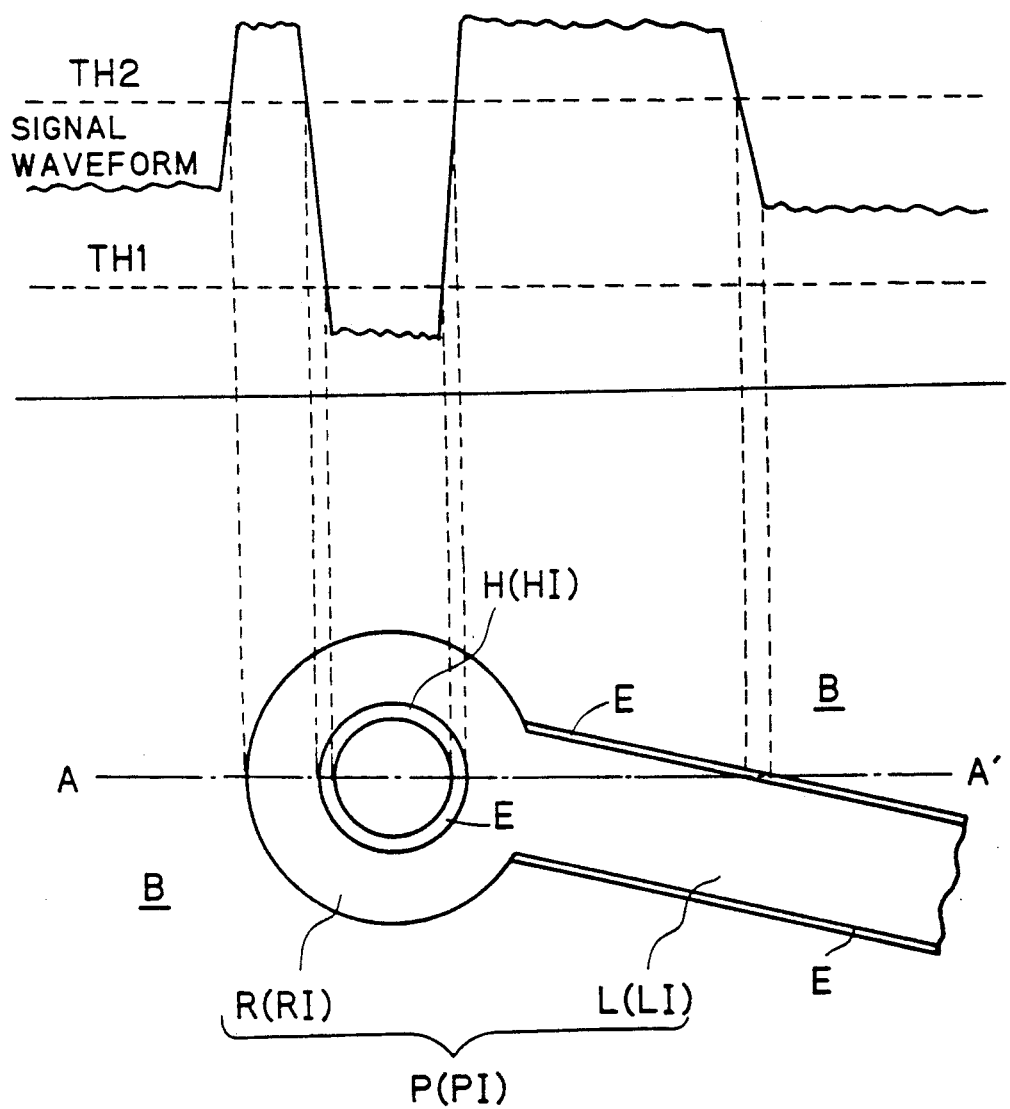
FIG. 17 is a diagram showing a signal waveform obtained in the system of FIG. 15 and a pattern obtained by synthesizing waveforms on respective scanning lines.

FIG. 17 illustrates a graph showing a signal waveform obtained in the CCD array 24 on a line A—A' in FIG. 15. FIG. 17 also illustrates an exemplary pattern obtained by synthesizing the signal waveforms obtained on respective scanning lines.

As shown in the signal waveform of FIG. 17, the level of the reflected light is relatively low at the base B, and a signal having a level between threshold values TH1 and TH2 (TH1<TH2) is obtained. In the wiring pattern P (the line L and the land R) which is formed by a metal such as copper, the level of the reflected light is high and a signal having a level exceeding the threshold value TH2 is obtained. In the through hole H, substantially no reflection is caused and a signal having a level below the threshold value TH1 is obtained. In general, edges E are present between the through hole H and the land R and between the line L and the base B. Such edge portions are inclined from the major surface of the printed board 11 and are not flat, so that the level of the reflected light is not constant but is substantially between the threshold values TH1 and TH2.

Signals from the image reader 20 are binarized in the binarizing circuits 21a and 21b shown in FIG. 14 with the threshold values TH1 and TH2 respectively, for example. The binarizing circuit 21a generates the hole image original signal $HSI_O$ representing a hole image HI. The hole image HI corresponds to the image of the through hole H. The other binarizing circuit 21b generates the pattern image original signal $PSI_O$ representing a pattern image PI. The pattern image PI corresponds to the image of the wiring pattern P (the line L and the land R). These two signals $HSI_O$ and $PSI_O$ representing the images HI and PI are signals required for the processing described below.

Figure 16:
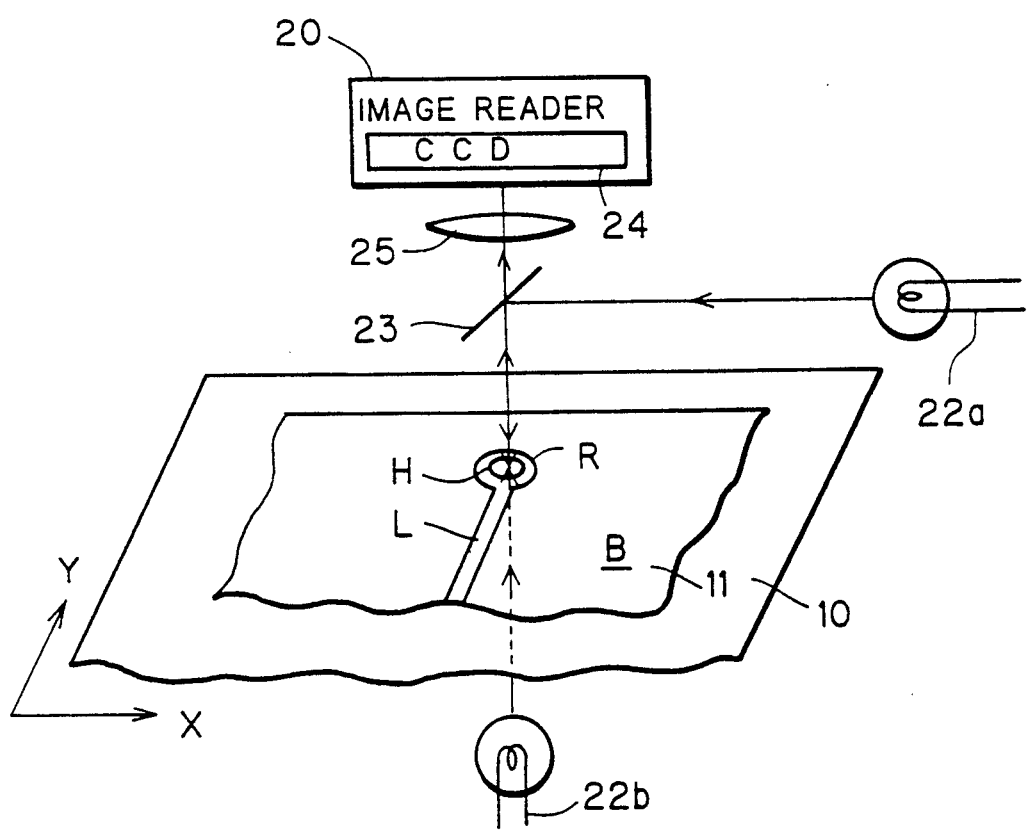
FIG. 16 is a conceptual diagram showing another system for image-reading through photoelectric scanning.

FIG. 16 shows another optical system for image-reading. Similarly to the system shown in FIG. 15, an image reader 20a comprises a CCD array 24. Light from a light source 22a is reflected at the printed board 11 and then enters the CCD array 24 through a half mirror 23 and a lens 25. In this system, another light source 22b is provided at the back of the stage 10, so that light passing through the through hole H also enters the CCD 24. Therefore, the through hole H provides the highest signal level and the wiring pattern P provides a substantially intermediate signal level. The base B and the edges E provide relatively low signal levels.

Alternatively, a plurality of CCD arrays 24 may be prepared. A part of them is used to detect the wiring pattern P by the light source 22b while the other part is used to detect only the through hole H by the other light source 22b. The respective signals thus obtained are separately delivered to the corresponding binarizing circuits 21a and 21b, respectively.

C. Pattern Inspection Circuit

Figure 18:
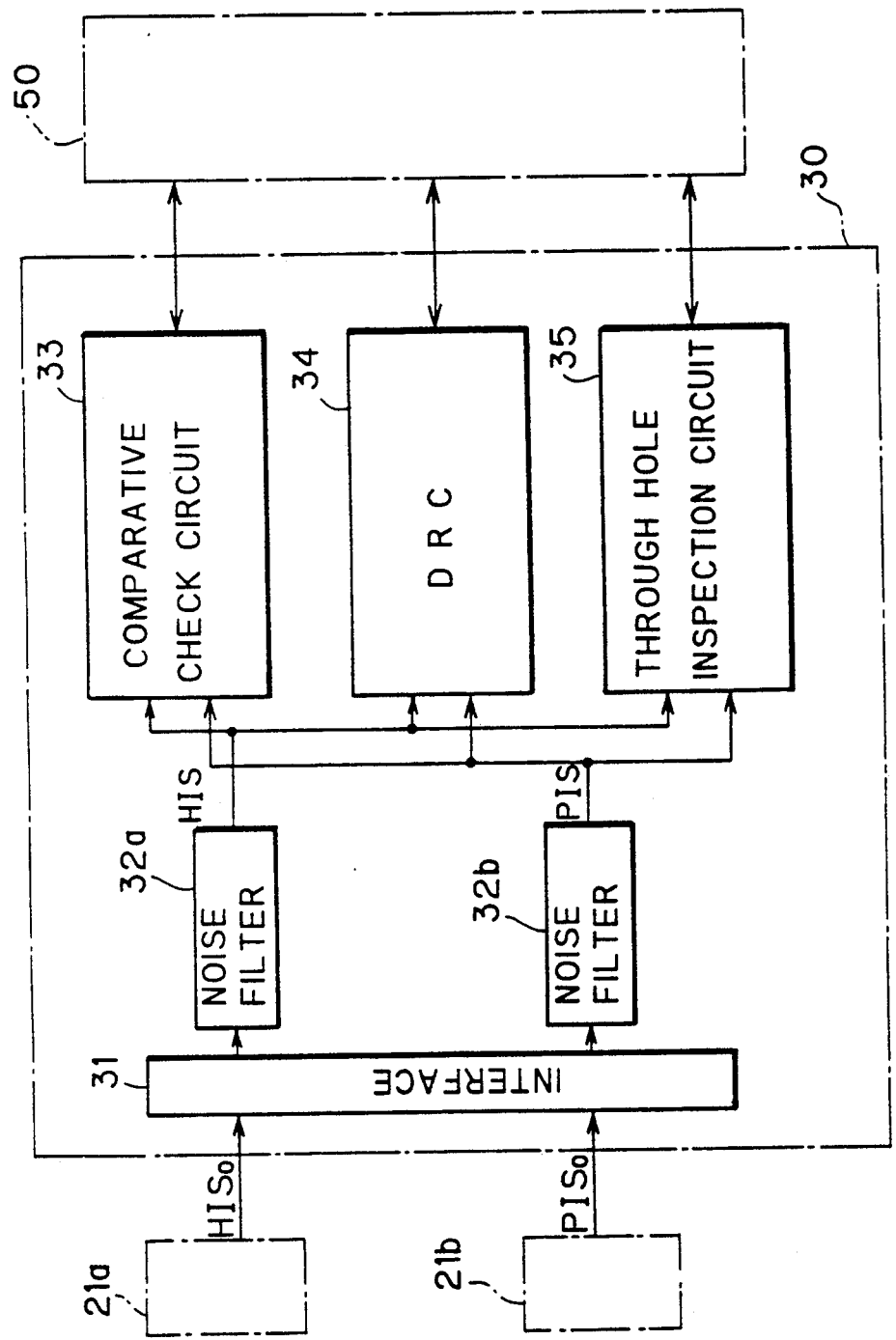
FIG. 18 is a block diagram showing the structure of a pattern inspection circuit 30.

FIG. 18 is a block diagram showing the internal structure of the pattern inspection circuit 30 shown in FIG. 14.

The hole image original signal $HIS_O$ and the pattern image original signal $PIS_O$ which are obtained in the binarizing circuits 21a and 21b (FIG. 14) are supplied to noise filters 32a and 32b respectively through an interface 31 in FIG. 18. The noise filters 32a and 32b remove noises from the signals $HIS_O$ and $PIS_O$ through smoothing processing or the like, to obtain a hole image signal HIS and a pattern image signal PIS respectively.

Both of the hole image signal HIS and the pattern image signal PIS are supplied to a comparative check circuit 33, a DRC (design rule check) circuit 34 and a through hole inspection circuit 35.

The comparative check circuit 33 is adapted to compare the hole image signal HIS and the pattern image signal PIS with image signals which are previously obtained from a reference printed board. The reference printed board is of the same type as the printed board 11 to be inspected and previously decided as nondefective. Portions of the objective printed board 11 which have images different from those of the reference printed board are specified as defects.

The through hole inspection circuit 35 is adapted to detect relative positional relation between the land R and the hole H provided on the printed board to inspect defectiveness of the printed board 11 by deciding whether or not this relation deviates from a reference one determined on design.

D. DRC Circuit

D-1. Outline

Before describing structures and operations of respective parts of the DRC circuit 34, the outline thereof is now described.

Figure 1:
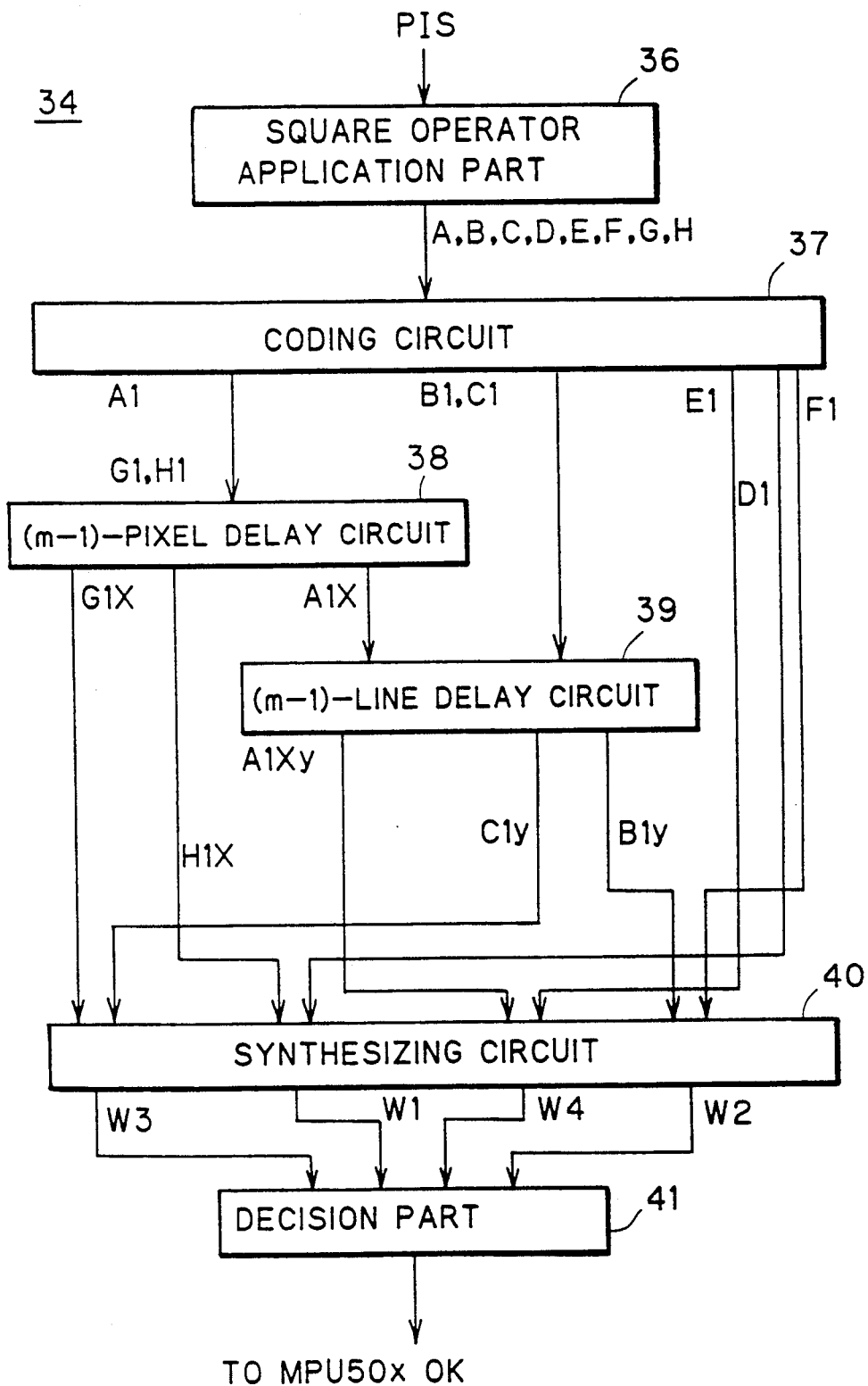
FIG. 1 is a block diagram schematically showing a DRC circuit 34.
Figure 2:
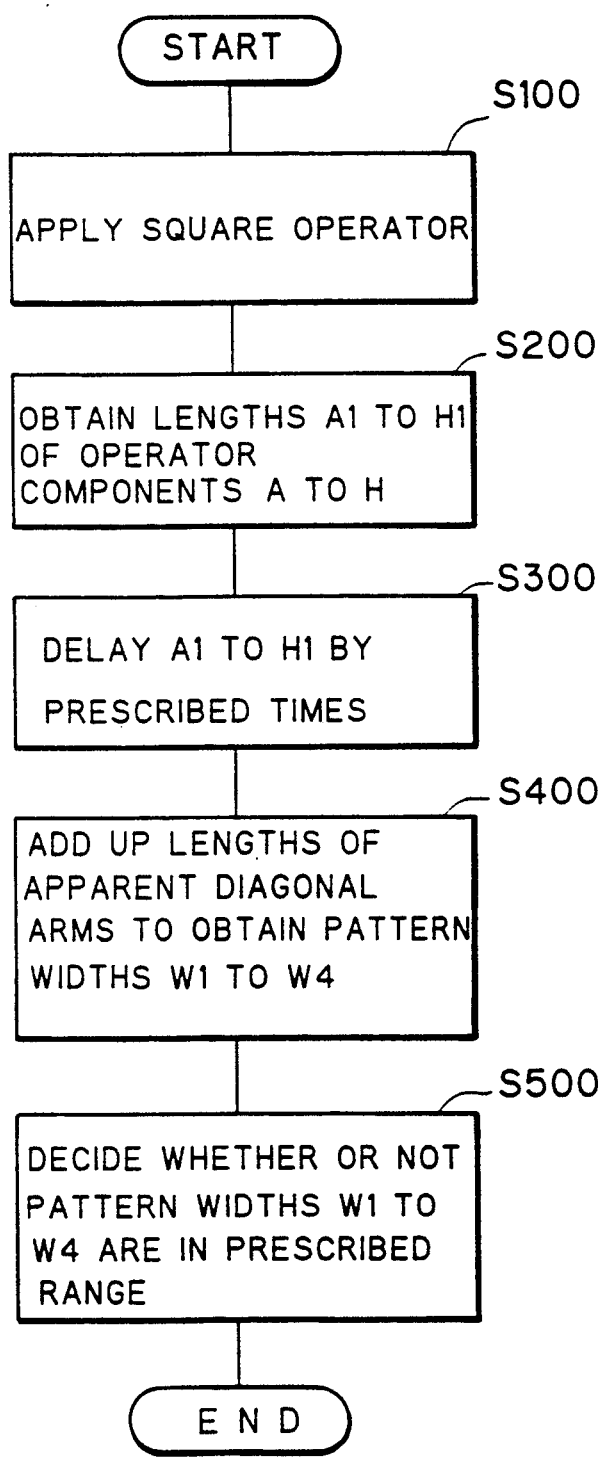
FIG. 2 is a flow chart showing the flow of operation of the DRC circuit 34.

FIG. 1 is a block diagram showing the outline of the DRC circuit 34, and FIG. 2 is a flow chart showing the flow of the operation of the circuit 34.

The DRC circuit 34 comprises a square operator application part 36. The square operator application part 36 holds a square operator SOP which is comprised of a square matrix of m×m pixels, where m is an integer larger than one. The pattern image signal PIS for respective pixels PIX is expanded into a two-dimensional array of pixel signals, which will be referred to as "a pixel data array" in the following description. The square operator SOP is applied to the pixel data array to extract four pixel trains A to H from the pixel data array. The four pixel trains A to H extend in different directions and are shown in FIGS. 5, 7, 9 and 11, which will be more fully described later. This process step corresponds to a step S100 in FIG. 2.

A coding circuit 37 is adapted to obtain respective length A1 to H1 of the components of the pixel trains A to H which continuously overlap the pattern image PI. This process step corresponds to a step S200 in FIG. 2.

An (m−1) pixel delay circuit 38 is operable to delay input signals for (m−1) pixels. On the other hand, an (m−1) line delay circuit 39 is operable to delay input signals for (m−1) lines. If m=6, these circuits 38 and 39 are five-pixel delay circuit and five-line delay circuit, respectively. These circuits 38 and 39 are provided for adjusting the transmission timings of the signals A1 to H1. This process step corresponds to a step S300.

A synthesizing circuit 40 is adapted to add up its input signals according to a predetermined rule, which will be more fully described later, to thereby obtain pattern widths W1 to W4. This process step corresponds to a step S400.

A decision part 41 is adapted to decide whether or not the pattern widths W1 to W4 are in a prescribed range and output signal OK representing the wiring pattern is defective or not. This step corresponds to a step S500.

D-2. Function of Square Operator

Figure 3:
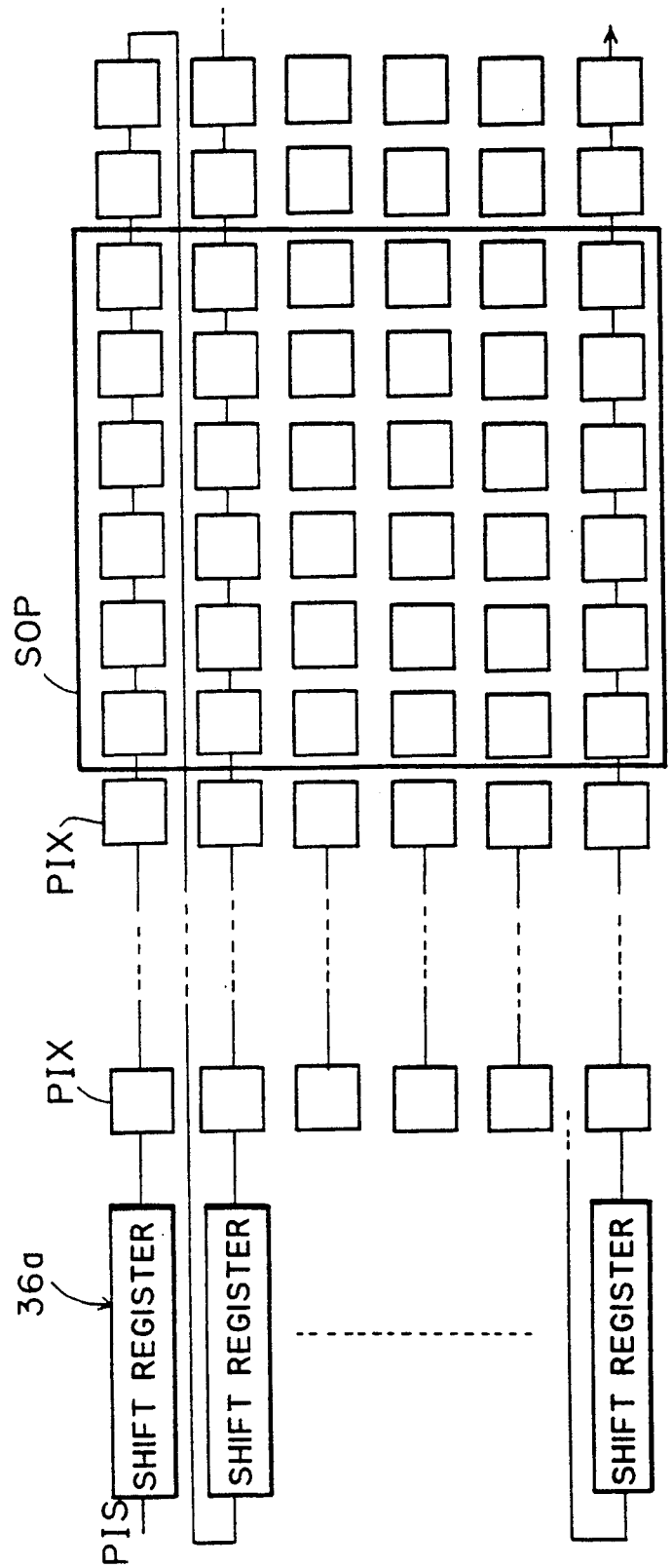
FIG. 3 is an explanatory diagram illustrating a matrix of registers according to a preferred embodiment of the present invention.
Figure 12:
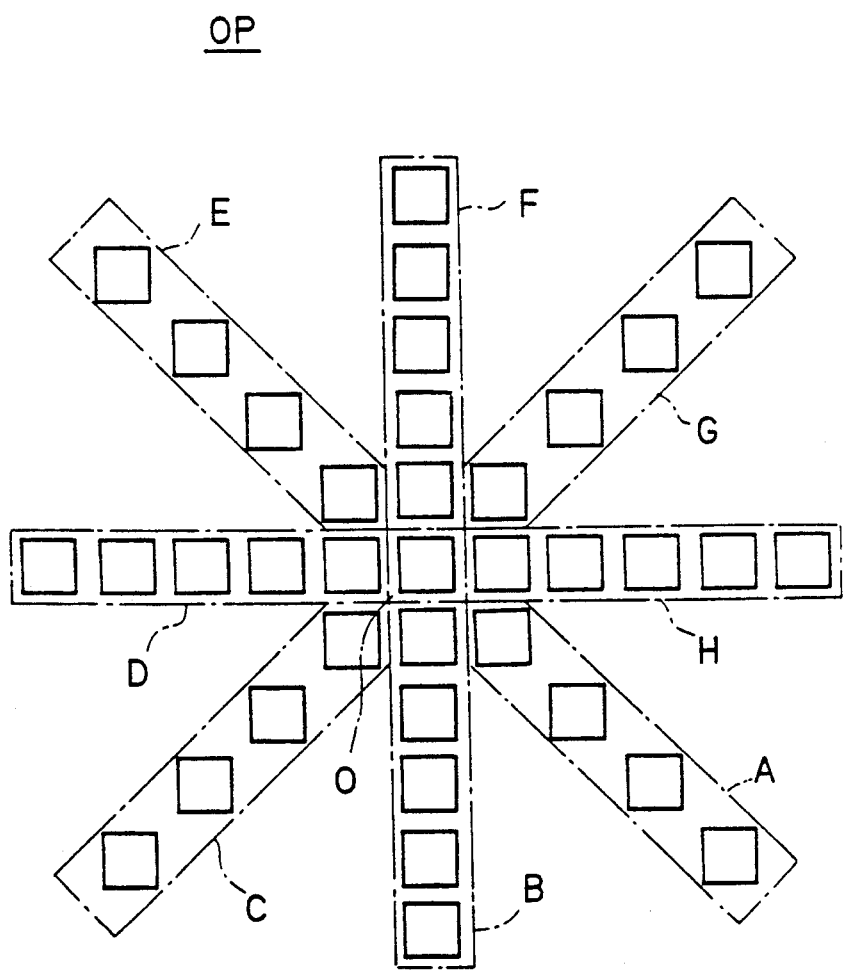
FIG. 12 is a diagram illustrating the radial operator which is equivalently obtained in the preferred embodiment of the present invention.

FIG. 3 schematically illustrates the square operator SOP. The pattern image signal PIS, which is delayed by a shift register group 36a, is expanded into the two-dimensional pixel data array of the pixels PIX. The square operator SOP comprised of a square matrix of m by m pixels or unit operators is applied to the pixel data array of the pixels PIX. FIG. 3 illustrates a case of six by six pixels (m=6). As described later, the present apparatus can perform inspection equivalent to the case where a radial operator OP (FIG. 12) having eight radial arms is employed. The radial operator OP is composed of eight arms of four or five pixels and a center pixel 0, and therefore, a pixel matrix of 11×11=121 pixels is required. On the other hand, the square operator SOP in the preferred embodiment requires only a pixel matrix of 6×6=36 pixels. In general, the function of a radial operator of (2m−1)×(2m−1) pixels is equivalently attained with a square operator of m×m pixels according to the preferred embodiment of the present invention, and the reduction ratio in the required number of pixels is:

$$m \times m / (2m-1) \times (2m-1)$$

$$\approx m \times m / (2m \times 2m)$$

$$= 1/4$$

D-3. Measurement of Length on Pixel Trains

The coding circuit 37 obtains the lengths A1 to H1 of the components of the pixel trains (arms) A to H of the square operator SOP which continuously overlap the wiring pattern P (step S200). These components will be referred to as "on-pattern components" in the following description.

Figure 4:
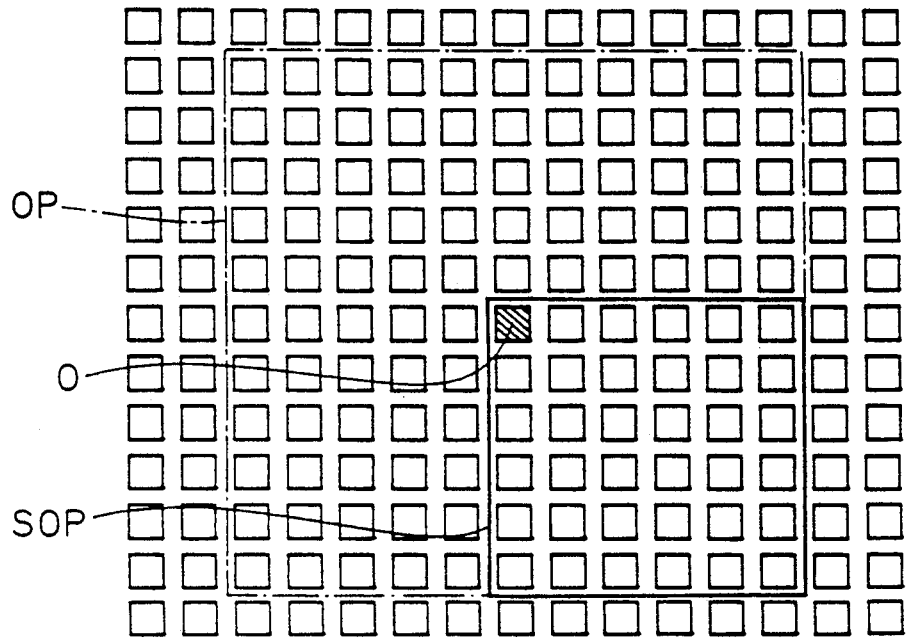
FIGS. 4, 6, 8 and 10 are explanatory diagrams illustrating positional relationships between an operator and an array of pixels according to the preferred embodiment of the present invention.
Figure 5:
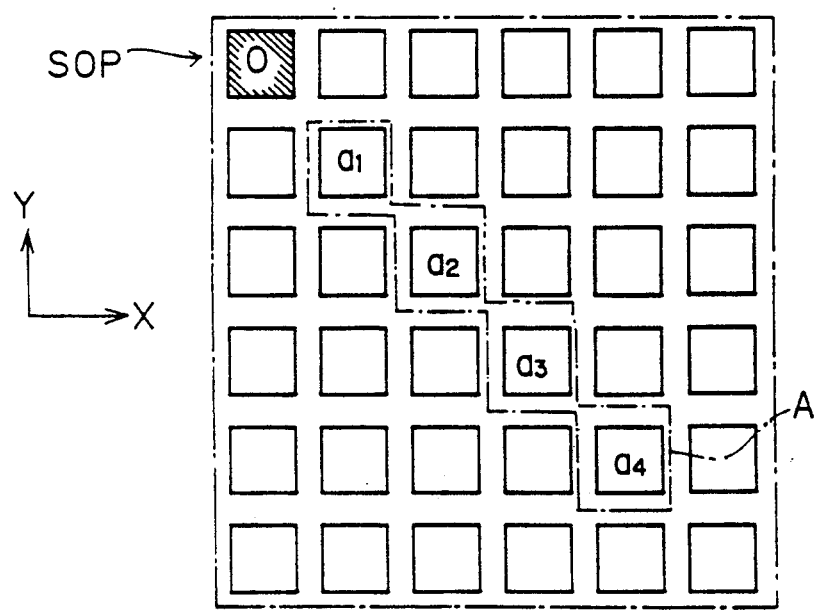
FIGS. 5, 7, 9 and 11 are explanatory diagrams illustrating chains of pixels under the conditions of FIGS. 4, 6, 8 and 10, respectively, where the chains of pixels are equivalent to arms of a radial operator.

Assuming that the operator SOP is in a position shown in FIG. 4 on the pixel data array, a noted center pixel 0 is positioned in an upper left corner of the operator SOP. The number of pixels which are continuously "1" in a diagonal direction including the central pixel 0 is counted to obtain the length A1. In order to obtain the length A1 of the On-pattern components of the pixel train A, the bits on pixels 0 $a_1$, $a_2$, $a_3$ and $a_4$ are inspected from the pixel 0 in a direction inclined by $-45°$ from the X direction, as shown in FIG. 5. The coding circuit 37 may comprise a priority encoder to count the number of the continuous pixels at "1".

Figure 6:
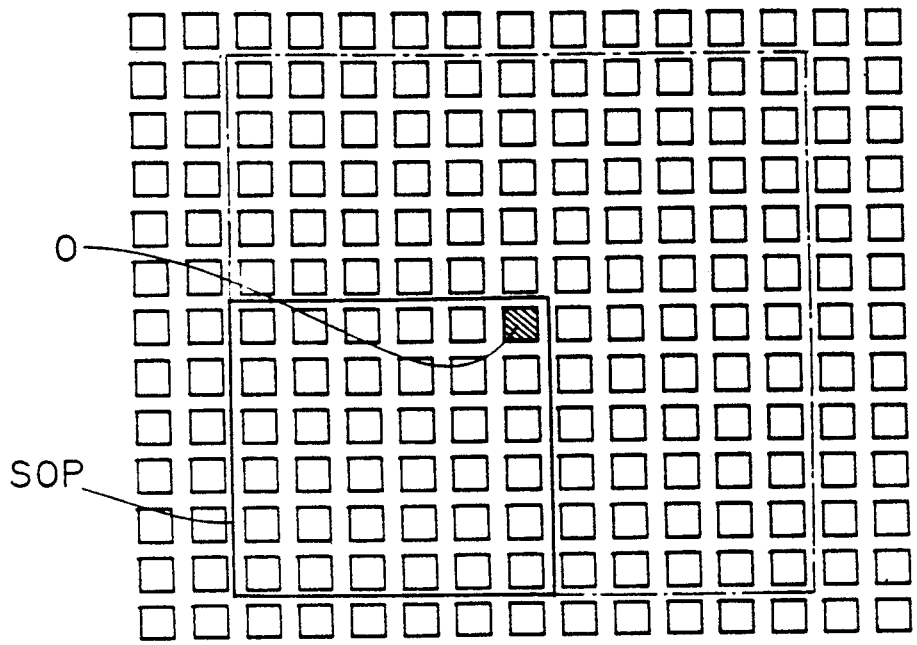
Figure 7:
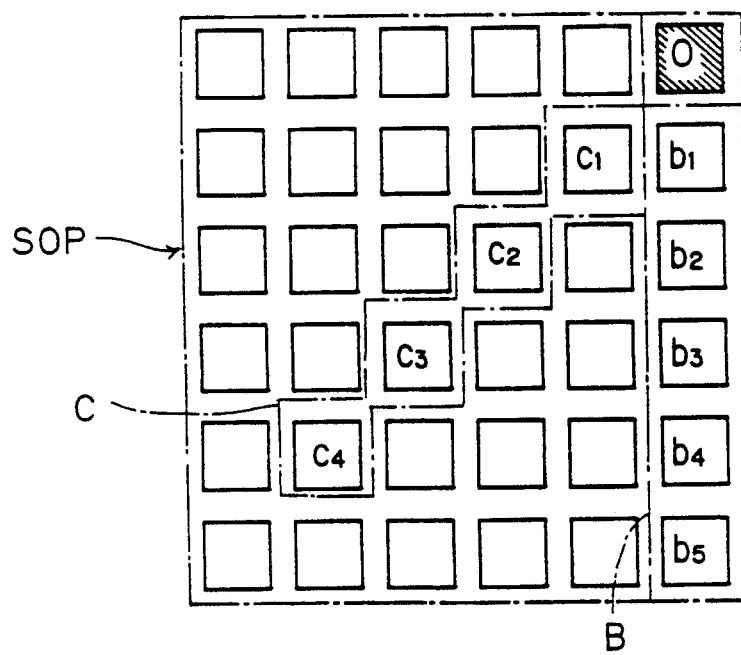

When the operator SOP is in a position shown in FIG. 6, the bits on pixels 0, $b_1$, $b_2$, $b_3$, $b_4$ and $b_5$ are counted from the pixel 0 in the vertical direction to obtain the length B1 of the on-pattern components of the pixel train B, as shown in FIG. 7. Further, the bits on pixels 0, $c_1$, $c_2$, $c_3$ and $c_4$ are counted to obtain the length C1 of the on-pattern components of the pixel train C.

Figure 8:
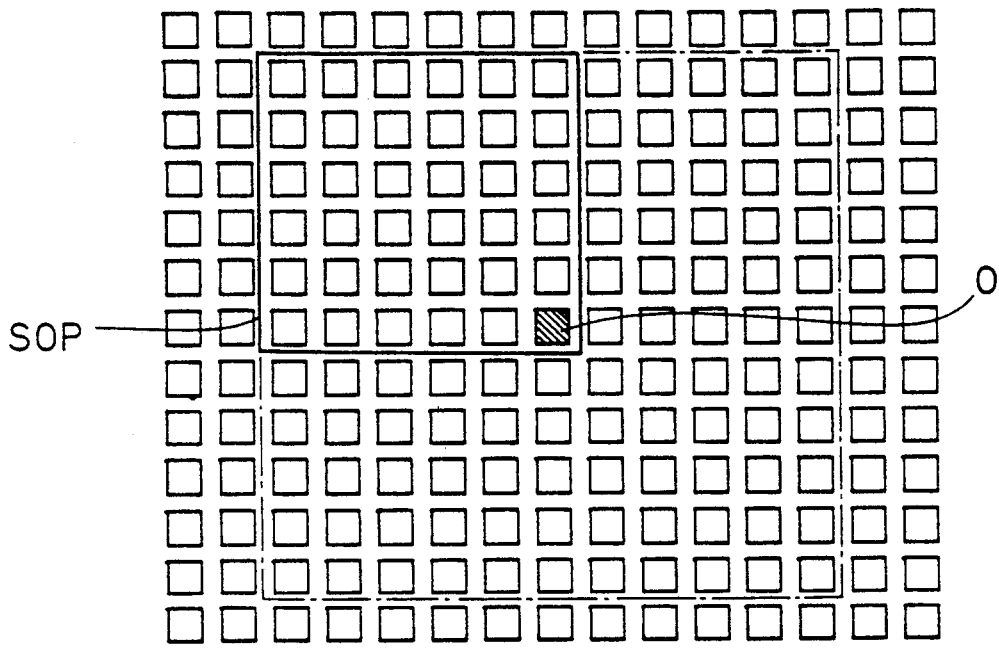
Figure 9:
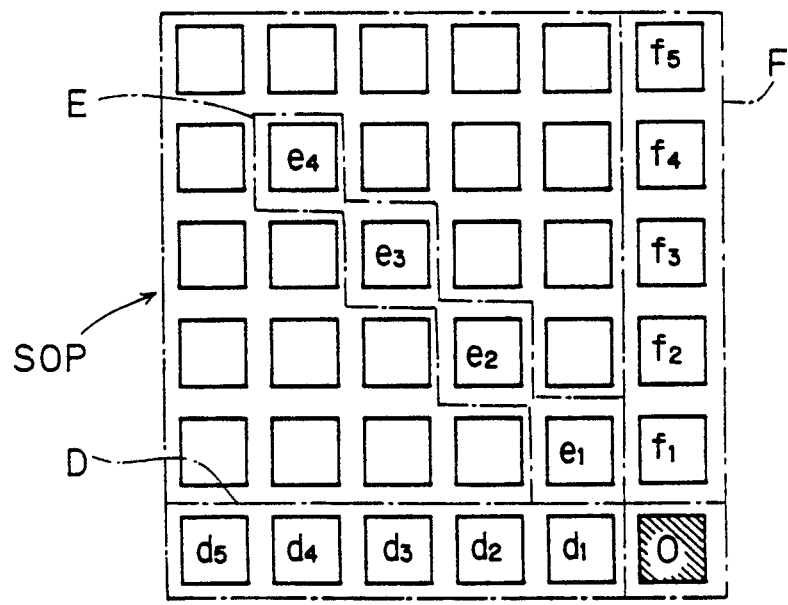
Figure 10:
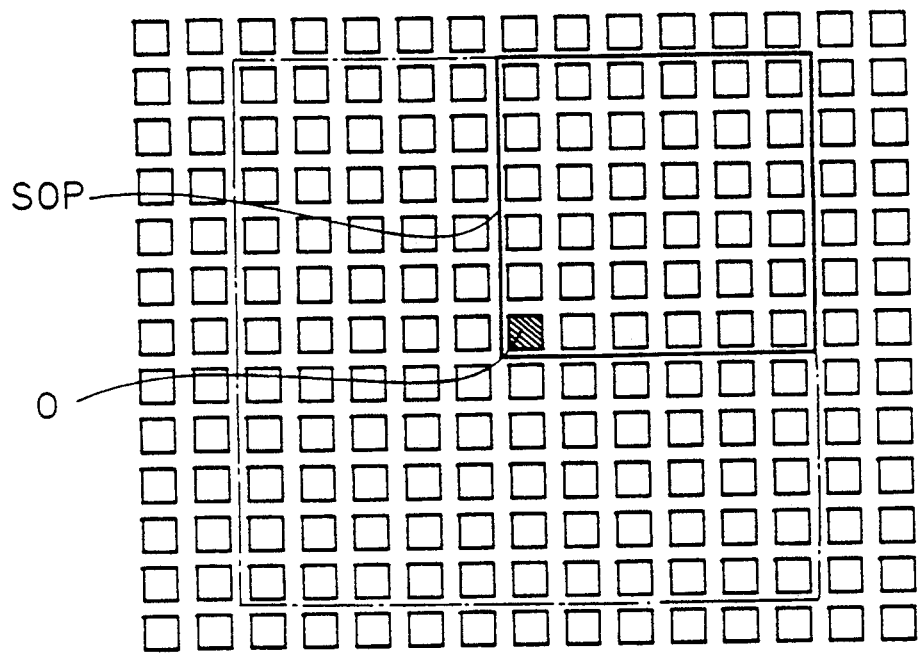
Figure 11:
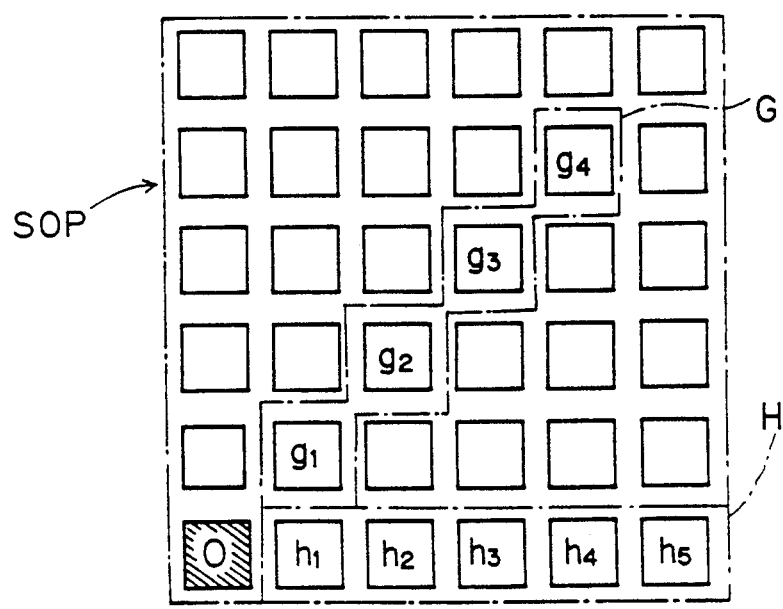

Similar counting operation is preformed with respect to the cases where the operator SOP is in positions shown in FIGS. 8 and 10, to obtain:

the length D1 of the on-pattern components of the pixel train D (FIG. 9) from the counted value of the bits on pixels 0, $d_1$, $d_2$, $d_3$, $d_4$ and $d_5$;

the length E1 of the on-pattern components of the the pixel train E (FIG. 9) from the counted value of the bits on pixels 0, $e_1$, $e_2$, $e_3$ and $e_4$;

the length F1 of the on-pattern components of the pixel train F (FIG. 9) from the counted value of the bits on pixels 0, $f_1$, $f_2$, $f_3$, $f_4$ and $f_5$;

the length G1 of the on-pattern components of the pixel train G (FIG. 11) from the counted value of the bits on pixels 0, $g_1$, $g_2$, $g_3$ and $g_4$; and the length H1 of the on-pattern components of the pixel train H (FIG. 11) from the counted value of the, bits on pixels 0, $h_1$, $h_2$, $h_3$, $h_4$ and $h_5$.

The pixel trains A to H are inclined from the X directions inclined from the X direction by $-45°$, $-90°$, $-135°$, $-180°$, $-225°$ $-270°$, $-315°$ and $-360°$, respectively.

Although the operator SOP is located in four different positions shown in FIGS. 4, 6, 8 and 10 in measurement of the lengths A1 to H1, the noted center pixel 0 is included in respective situations. When the transmission timings of signals representing the lengths A1 to H1 are appropriately adjusted, therefore, the lengths A1 to H1 around the center pixel 0 can be obtained at a same timing. In other words, the measurement of the lengths A1 to H1 and the delay operation provide the same result as the radial operator OP (FIG. 12) having eight arms A to H as can be obtained without the large scale radial operator OP.

D-4. Data Delay

In order to obtain the result equivalent to the case where the radial operator OP is employed, the signals representing the lengths A1 to H1, the delay circuits 38 and 39 delay part of the signals of lengths A1 to H1 (step S300).

The (m−1) pixel delay circuit 38 includes shift registers to delay the signals of the lengths A1, G1 and H1 by a time period required to progress the main scanning by (m−1) pixels. The number (m−1) is smaller by one than the number of pixels forming each side of the square defining the contour of the square operator SOP. The reason why this delay is applied to the signals of the lengths H1 and G1 is that the position of the square operator SOP in FIG. 10 precedes that of FIG. 8 by (m−1) pixels in the main scanning, as understood from FIGS. 8 to 11. The reason why the signal A1 is delayed is explained later. The delayed signals are shown in FIG. 1 as signals A1x, G1x and H1x.

On the other hand, the pixel trains D, E and F appear in the operator OP at the latest timing among respective pixel trains A to H, no delay is applied to the signals of the lengths D1, E1 and F1, as shown in FIG. 1.

The (m−1) line delay circuit 39 has a delay memory to delay the signals A1x, B1 and C1 by (m−1) scanning lines, i.e., by (m−1) by (m−1) pixels. The reason why the signals B1 and C1 are subjected to this line-delay is that the position of the square operator SOP in FIG. 6 precedes that of FIG. 8 by (m−1) scanning lines in the subscanning process. The delayed signals are shown in FIG. 1 as signals B1y and C1y. As to the pixel train A, the position of the square operator SOP in FIG. 4 precedes that of FIG. 8 by (m−1) pixels and (m−1) scanning lines as understood from comparison between FIGS. 4 and 5 and that between FIGS. 8 and 9. Thus, the signal A1 is subjected to both of the (m−1) pixel delay and the (m−1) line delay to become a signal A1xy (FIG. 1).

The signals representing the lengths A1xy, B1y, C1y, D1, E1, F1, G1x and H1x are delivered to the synthesizing circuit 40.

D-5. Data Synthesis

The synthesizing circuit 40 synthesizes the lengths A1xy, B1y, C1y, D1, E1, F1, G1x and H1x such that two length signals of pixel trains which are apparently aligned to each other are synthesized, to obtain the numbers of pixels being continuously "1" in respective four directions. The numbers of pixels thus obtained represent the pattern widths in each of the four directions (step S400).

In more concrete terms, this circuit 40 adds up the delayed length signal H1x for the pixel train H and the length signal D1 for the pixel train D together with the length "1" of the center pixel O to obtain a pattern width W1 in the X direction as follows:

$$W1 = H1x + D1 + 1 \tag{1}$$

Similarly, the circuit 40 obtains pattern widths W2 to W4 as:

$$W2 = B1y + F1 + 1 \tag{3}$$

$$W3 = G1x + C1y + 1 \tag{4}$$

$$W4 = A1xy + E1 + 1 \tag{5}$$

where:
the width W2 is a pattern width in the Y direction;
the width W3 is a pattern width in a direction which forms an angle of $-315°$ or $-135°$ with respect to the X direction; and
the width W4 is a pattern width in a direction which forms an angle of $-225°$ or $-45°$ with respect to the X direction.

In order to perform these additions, the synthesizing circuit 40 comprises adders.

D-6. Decision of Defective

The decision part 41 decides whether the wiring pattern image P is defective or not from the four-directional pattern widths W1, W2, W3 and W4 obtained by the synthesizing circuit 40 (step S500). The image-reading is time-sequential one as already described, and therefore, this decision is carried out for each position of the center 0 of the operator SOP on the pattern image PI.

Figure 13:
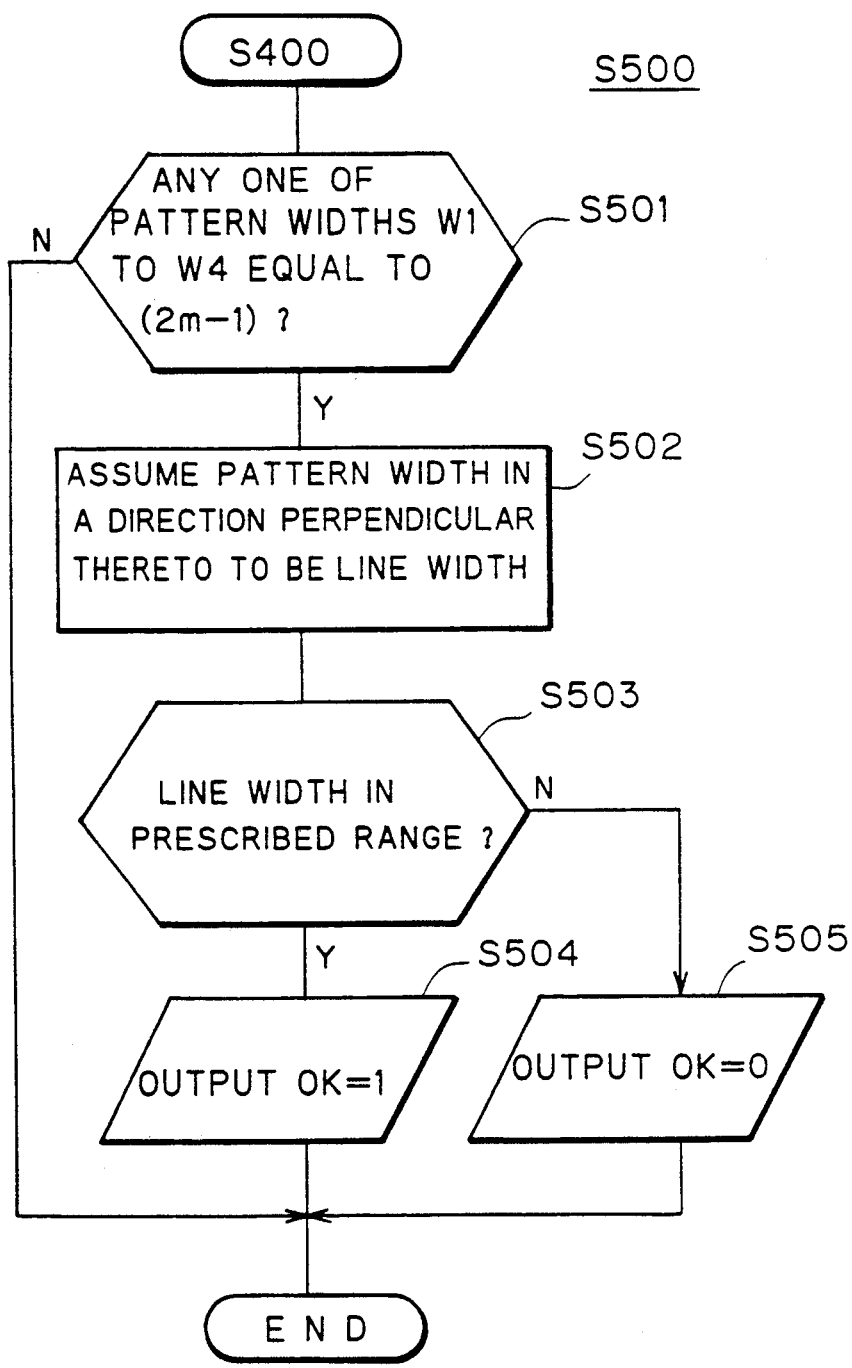
FIG. 13 is a flow chart showing a step S500 of FIG. 2 in detail.

In inspection of line widths, for example, the following processing is performed:

Referring to FIG. 13, it is first examined in a step S500 whether or not one of the widths W1, W2, W3 and W4 has the value of (2m−1). If a width Wi (i=1, 2, 3 or 4) having the value of (2m−1) is found, i.e., a straight couple of pixel trains $(\alpha, \beta)$=(A, E), (B, F), (C, G) or (D, H) on which all pixels are "1" are found, it is decided that the line L runs in the train direction of $(\alpha, \beta)$. Then, a line width is obtained in a step S502 from the width Wj (j=1, 2, 3 or 4) which is a pattern width in the direction perpendicular to the straight couple of pixel trains $(\alpha, \beta)$. The line width Wj is compared with threshold values defining an allowable range (step S503). If the line width is within the allowable range, it is decided that the line L is not defective and the signal OK=1 indicating that the line is nondefective is output (step S504). If the line width Wj is not in the range, it is decided that the line L is defective and the signal OK=0 indicating that the line is defective is output step S505).

In addition, the decision part 41 can decide pattern defects, shorting between the lines L, and the like.

Further, the synthesizing circuit 40 can synthesize the lengths A1 and B1 as well as the lengths B1 and C1. In this case, the decision part 41 can inspect a portion where the line L has bending of 45°.

In general, the present invention is effective for inspecting the geometrical shape of the wiring pattern by obtaining values representing the same.

Figure 19:
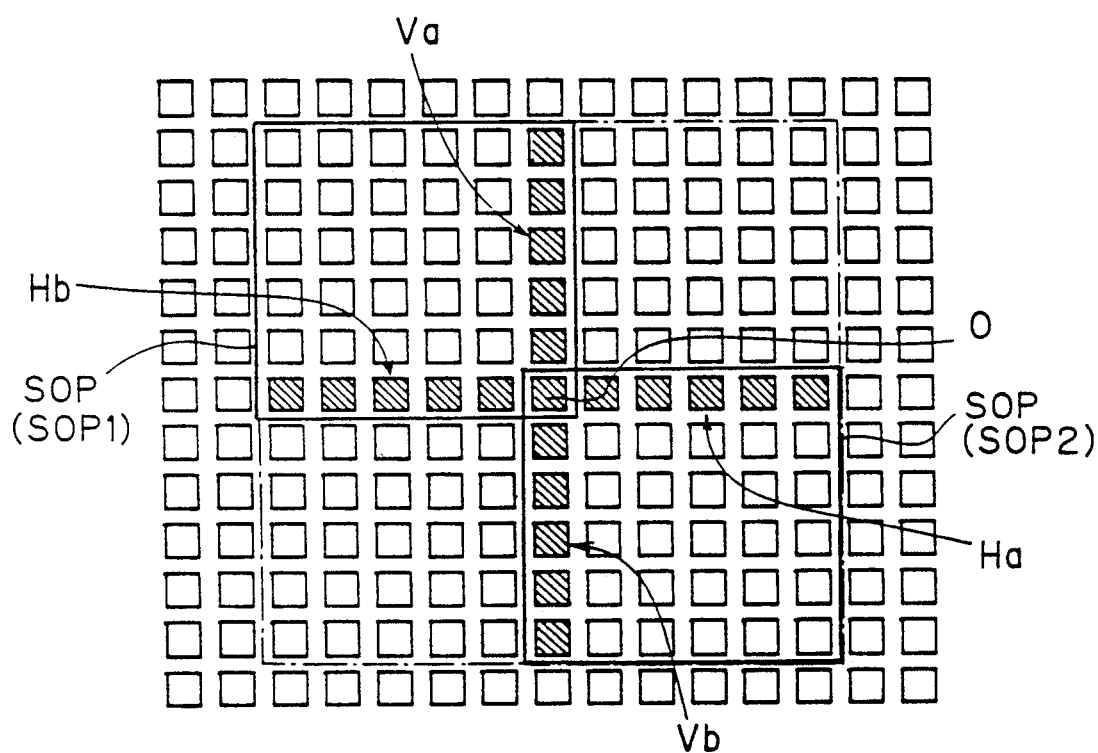
FIG. 19 is an explanatory diagram illustrating positional relationships between an operator and an array of pixels according to a modification of the preferred embodiment of the present invention.
Figure 20:
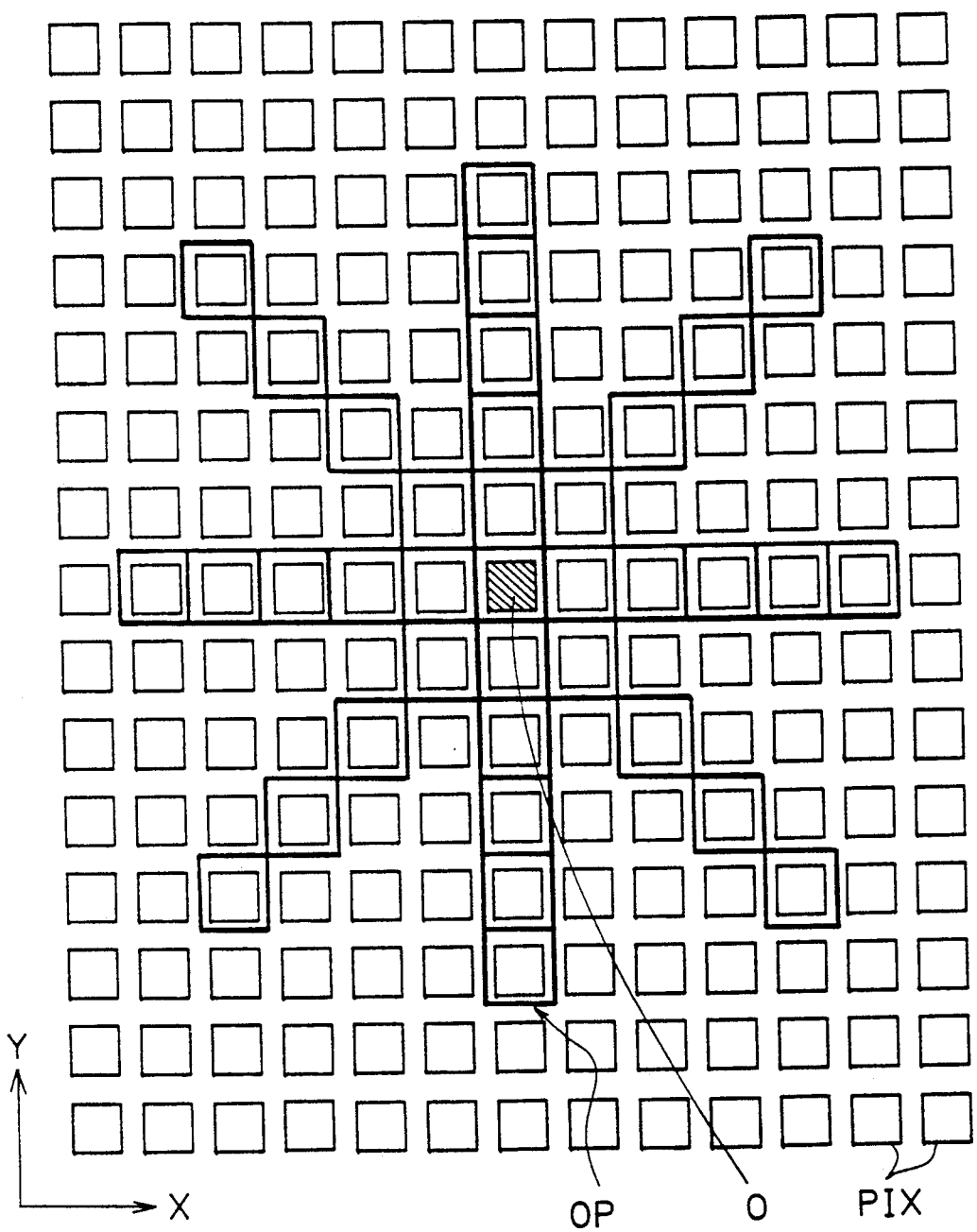
FIG. 20 is an explanatory diagram showing a matrix of pixels and a conventional radial operator.

According to the present invention, a cross operater, which belongs to "radial operators", can be also equivalently obtained. In this case, only two horizontal two pixel trains Ha and Hb (FIG. 19) and two vertical pixel trains Va and Vb are required. Thus, as understood from FIG. 19, the positions at which the operator SOP is applied to the pixel array may be two positions SOP1 and SOP2.

In general, the inspection of the pattern image PI around the noted pixel 0 can be attained by applying the pixel operator SOP at least two parts on the pixel data array.

While the invention has been shown and described in detail, the foregoing description is in all aspects illustrative and not restrictive. It is therefore understood that numerous modifications and variations can be devised without departing from the scope of the invention.

We claim:

1. A method of inspecting a wiring pattern provided on a printed board, comprises the step of:
   (a) reading an image of said wiring pattern to obtain a pattern image comprised of a pixel array;
   (b) applying a pixel operator to a first part of said pixel array to obtain first signals, wherein said pixel operator is comprised of a square matrix array of unit pixel operators;
   (c) relatively shifting said pixel operator from said first part of said pixel array to a second part of said pixel array;
   (d) applying said pixel operator to said second part of said pixel array to obtain second signals;
   (e) delaying said first signals to obtain delayed first signals;
   (f) combining said second signals with said delayed first signals to obtain a set of signals; wherein said set of signals have values representing a geometric shape of said pattern image on a radial array of pixels having a size larger than said pixel operator; and
   (g) inspecting said wiring pattern on the basis of said set of signals;
   said step (b) comprising the step of:
   (b-1) obtaining said first signals on a first pixel train extending in a first direction on said first part of said pixel array; and
   said step (d) comprises the step of:
   (d-1) obtaining said second signals on a second pixel train extending in a second direction on said second part of said pixel array, wherein said first direction is different from said second direction.

2. The method of claim 1, wherein the step (c) comprises the step of:
   (c-1) relatively shifting said pixel operator from said first part of said pixel array to said second part of said pixel array such that a center pixel of said radial array of pixels belongs to both of said first and second parts of said pixel array.

3. The method of claim 2, wherein the step (e) comprises the step of:
   (e-1) delaying said first signals by a time period required for said pixel operator to relatively shift from said first part of said pixel array to said second part of said pixel array.

4. The method of claim 3, wherein said first and second parts of said pixel array include different quarters of a square pixel matrix on said pixel array, respectively;
   third and fourth parts of said pixel array are so defined as to include remaining two quarters of said square pixel matrix, respectively;
   said method further comprises the steps of:
   (h) relatively shifting said pixel operator to said third part of said pixel array;
   (i) applying said pixel operator to said third part of said pixel array to obtain third signals;
   (j) delaying said third signals to obtain delayed third signals;
   (k) relatively shifting said pixel operator to said fourth part of said pixel array;
   (l) applying said pixel operator to said fourth part of said pixel array to obtain fourth signals; and
   (m) delaying said fourth signals to obtain delayed fourth signals; and
   the step (f) comprises the step of:
   (f-1) combining said second signals with said delayed first signals, third signals and fourth signals to obtain said set of signals.

5. An apparatus for inspecting a wiring pattern provided on a printed board, comprising:
   (a) means for reading an image of said wiring pattern to obtain a pattern image comprised of a pixel array;
   (b) means for applying a pixel operator to a first part of said pixel array to obtain first signals, wherein said pixel operator is comprised of a square matrix array of unit pixel operators;
   (c) means for relatively shifting said pixel operator from said first part of said pixel array to a second part of said pixel array;
   (d) means for applying said pixel operator to said second part of said pixel array to obtain second signals;

(e) means for delaying said first signals to obtain delayed first signals;

(f) means for combining said second signals with said delayed first signals to obtain a set of signals;

said set of signals have values representing a geometric shape of said pattern image on a radial array of pixels having a size larger than said pixel operator; and (g) means for inspecting said wiring pattern on the basis of said set of signals;

said means (b) comprising:

(b-1) means for obtaining said first signals on a first pixel train extending in a first direction on said first part of said pixel array; and said means (d) comprising:

(d-1) means for obtaining said second signals on a second pixel train extending in a second direction on said second part of said pixel array, wherein said first direction is different from said second direction.

6. The apparatus of claim 5, wherein the means (c) comprises:

(c-1) means for relatively shifting said pixel operator from said first part of said pixel array to said second part of said pixel array such that a center pixel of said radial array of pixels belongs to both of said first and second parts of said pixel array.

7. The apparatus of claim 6, wherein the means (e) comprises:

(e-1) means for delaying said first signals by a time period required for said pixel operator to relatively shift from said first part of said pixel array to said second part of said pixel array.

8. The apparatus of claim 7, wherein said first and second parts of said pixel array include different quarters of a square pixel matrix on said pixel array, respectively;

third and fourth parts of said pixel array are so defined as to include remaining two quarters of said square pixel matrix, respectively;

said apparatus further comprises:

(h) means for relatively shifting said pixel operator to said third part of said pixel array;

(i) means for applying said pixel operator to said third part of said pixel array to obtain third signals;

(j) means for delaying said third signals to obtain delayed third signals:

(k) means for relatively shifting said pixel operator to said fourth part of said pixel array (l) means for applying said pixel operator to said fourth part of said pixel array to obtain fourth signals; and (m) means for delaying said fourth signals to obtain delayed fourth signals; and the means (f) comprises the means of:

(f-1) means for combining said second signals with said delayed first signals, third signals and fourth signals to obtain said set of signals.

* * * * *